United States Patent
Kubo

(10) Patent No.: US 6,829,105 B2
(45) Date of Patent: Dec. 7, 2004

(54) OBJECTIVE OPTICAL SYSTEM FOR OPTICAL PICK-UP

(75) Inventor: Wataru Kubo, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/253,631

(22) Filed: Sep. 25, 2002

(65) Prior Publication Data

US 2003/0147148 A1 Aug. 7, 2003

(30) Foreign Application Priority Data

Sep. 28, 2001 (JP) ........................................ 2001-303336

(51) Int. Cl.⁷ .............................................. G02B 13/18
(52) U.S. Cl. ...................................... 359/719; 359/718
(58) Field of Search ................................ 359/719, 718, 359/721, 708, 642; 369/112.01, 112.23

(56) References Cited

U.S. PATENT DOCUMENTS

| | | | |
|---|---|---|---|
| 4,613,212 A | | 9/1986 | Norikazu ..................... 359/719 |
| 5,553,052 A | * | 9/1996 | Oono et al. ............ 369/112.17 |
| 5,764,613 A | | 6/1998 | Yamamoto et al. .... 369/112.24 |
| 2002/0167739 A1 | * | 11/2002 | Ota et al. .................... 359/798 |
| 2003/0076767 A1 | * | 4/2003 | Shimano et al. ........ 369/112.23 |
| 2003/0152014 A1 | * | 8/2003 | Maruyama ............. 369/112.26 |

FOREIGN PATENT DOCUMENTS

| | | |
|---|---|---|
| GB | 2359377 | 8/2001 |
| JP | 2001-297471 | 10/2001 |

* cited by examiner

Primary Examiner—Jordan M. Schwartz
(74) Attorney, Agent, or Firm—Greenblum & Bernstein, P.L.C.

(57) ABSTRACT

A single-element objective lens for an optical pick-up is configured to converge substantially parallel light rays incident thereon onto a data recording surface of an optical recording medium. The objective lens includes, a first surface, which is a light incident side surface, and a second surface, which is an optical recording medium side surface. The first surface is an aspherical surface having a positive power, and the second surface is an aspherical surface having positive or negative power. The objective lens is designed such that paraxial wavefront aberration is 0.07λ rms or less when a decentering amount between the first and second surfaces is 2 μm or less so as to converge the incident light substantially to a diffraction limit. A numerical aperture of the objective lens is 0.8 or more.

2 Claims, 12 Drawing Sheets

OBJECTIVE OPTICAL SYSTEM FOR OPTICAL PICK-UP

BACKGROUND OF THE INVENTION

The present invention relates to an objective optical system for an optical pick-up which is used to write/readout data from/on an optical disc such as CD or DVD.

The optical pick-up is generally configured such that a laser beam emitted by a laser diode is converged on a data recording surface of the optical disc as a beam spot.

For example, in an optical data reproducing and/or recording device, a laser beam is emitted by a laser diode, as a diverging beam having an oval-shaped cross section. The diverging laser beam is then collimated by a collimating lens arranged in front of the laser diode. The collimated laser beam is incident on a beam shaping prism, which changes the oval cross section of the laser beam to a circular cross section. Then, using, for example, a mirror, the laser beam is reflected to proceed in a direction parallel with a radial direction of the optical disc. The laser beam is reflected again to proceed toward the data recording surface of the optical disc, by a mirror provided in a carriage. The carriage may be configured to be movable in a tracking direction, so that the laser beam is incident on the data recording surface perpendicularly via an objective optical system, which is also mounted on the carriage and converges the laser beam on the data recording surface of the optical disc.

An earlier objective optical system typically consisted of a single lens element, which is formed according to a plastic molding method. Therefore, a numerical aperture NA of the objective optical system was relatively small. Since a data density of the optical disc such as a CD is relatively small, the NA of the objective optical system was sufficient.

Recently, the data density has become relatively large, which requires a relatively small beam spot formed on the data recording surface of the optical disc. Accordingly, the numerical aperture is required to be 0.8 or more. The assignee has suggested, in Japanese Patent Application No. 2000-29879, an objective optical system consisting of a single-element glass lens having a very high NA.

When such a glass lens is formed using a mold, it is difficult to align the central axes of components of the mold respectively for forming both lens surfaces of the objective optical system. That is, in order to pick up a lens from the mold, the mold should be separated into two components. In order for allowing the mold to move inside a molding apparatus, clearances should be provided between the components of a mold, and between each mold and molding apparatus. Within such a clearance, the position/orientation of the molds is not restricted. As a result, it becomes difficult to align the central axes of both components of each mold, and the thus formed lens surfaces are decentered (i.e., the two surfaces are shifted relative to each other in a direction perpendicular to the optical axis of the objective lens). If the lens surfaces are decentered with each other, the performance of the lens in terms of the wavefront aberration is deteriorated. Therefore, it is important that the objective lens is designed so that the allowance of the decentering amount is made as large as possible, thereby the objective lens can be manufactured easily. In the above-described application, the objective lens is formed as a plano-convex lens so that the decentering allowance is very large, almost limitless.

When a plano-convex lens is formed to have a high NA, more than 0.8, coma cannot be compensated sufficiently for the abaxial light rays since one of the surfaces is a planar surface. Then, an area of the image side lens surface capable of maintaining a sufficient spot performance is limited. As a result, when the objective lens is mounted on a pick-up device or a fine actuator, the central axis of the incident beam and the optical axis of the objective lens should be aligned precisely. Therefore, the assembling efficiency is worsened. Further, if an alignment of the central axis of the incident beam and the optical axis of the objective lens is shifted due to some reason after the objective lens is fixed, the performance of the lens regarding the wavefront aberration is deteriorated excessively. Thus, allowance of an assembling error of the optical pick-up is very small, and hard to use.

SUMMARY OF THE INVENTION

The present invention is advantageous in that the above problems are solved. Further, although the objective lens is a single-element lens having a relatively large numerical aperture, it provides a sufficiently large image circle, thereby an assembling margin is relatively large. Further, according to an objective lens provided according to the invention, even though the surfaces are decentered within a predetermined allowance when the objective lens is manufactured with a mold, the performance thereof is not deteriorated. Therefore, the objective lens can be manufactured at a high yield ratio.

According to embodiments of the invention, there is provided a single-element objective lens for an optical pick-up, said objective lens converging substantially parallel light incident thereon onto a data recording surface of an optical recording medium. A first surface, which is a light incident side surface, of said objective lens is an aspherical surface having a positive power. A second surface, which is an optical recording medium side surface, of said objective lens is an aspherical surface having one of positive and negative power. Paraxial wavefront aberration is 0.07λ rms or less when a decentering amount between said first and second surfaces is 2 μm or less so as to converge the incident light substantially to a diffraction limit, a numerical aperture of said objective lens being 0.8 or more.

With this configuration, since the NA is 0.8 or greater, the objective lens can be used for an optical disc having a relatively high data density. Since the objective optical system consists of the single-element lens, a fine actuator conventionally used for holding a conventional single-element objective lens can be used for the high NA objective lens. Further, according to the objective lens configured as above, an image circle is enlarged. Therefore, even though the light beam, which consists of substantially parallel light rays, emitted by a light source unit of the optical pick-up device is inclined with respect to the optical axis of the objective lens, the performance of the lens in terms of the wavefront aberration will not be deteriorated significantly.

Optionally, the objective lens is made of glass material having a refractive index of 1.6 or more, with the objective lens being formed by molding.

Further, when an aspherical surface is expressed by equation:

$$Fi(h) = \frac{h^2}{1 + \sqrt{1 - (1+\kappa)h^2/r^2}} + A_4 h^4 + A_6 h^6 + A_8 h^8 + A_{10} h^{10} + A_{12} h^{12}$$

where, h represents a height of a point on the aspherical surface with respect to the optical axis, Fi(h) represents a SAG amount which is defined as a distance from a point on the aspherical surface to a plane tangential to the aspherical surface at the optical axis, i represents a surface number (i.e. F1(h) represents the shape of the light source module side, and F2(h) represents the shape of the optical disc side), r is a radius of curvature on the optical axis, k represents a conical coefficient, $A_4$, $A_6$, $A_8$, $A_{10}$ and $A_{12}$ are aspherical coefficients for fourth, sixth, eighth, tenth and twelfth order terms, then, each of the first and second surfaces are preferably formed to satisfy conditions below:

$-2 \leq dF1(h)/dh \leq +2$, $-0.1 \leq dF2(h)/dh \leq +0.1$, $+0.5 \leq d^2F1(h)/dh^2 \leq +3.5$, and $-0.2 \leq d^2F2(h)/dh^2 \leq +0.2$.

BRIEF DESCRIPTION OF THE ACCOMPANYING DRAWINGS

DETAILED DESCRIPTION OF THE EMBODIMENTS

Hereinafter, objective lenses according to three embodiments will be described with reference to the accompanying drawings.

Figure 1:
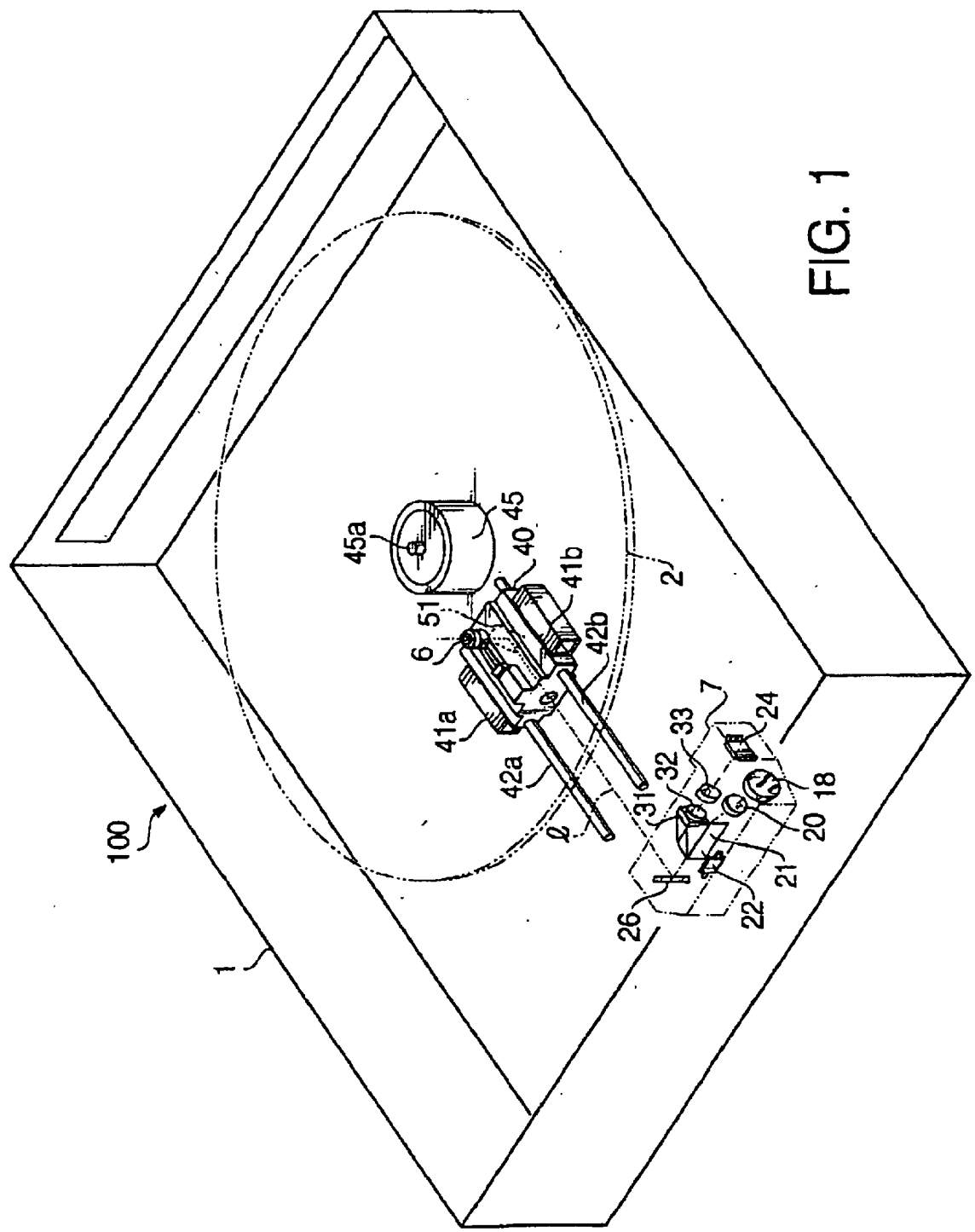
FIG. 1 is a perspective view showing main components of an optical disc recording/reproducing apparatus employing an objective lens according to an embodiment of the invention.

FIG. 1 is a perspective view of main components of an optical disc drive 100 (e.g., an MO disc drive) to which any of the objective lenses according to the embodiments is applicable.

Figure 2:
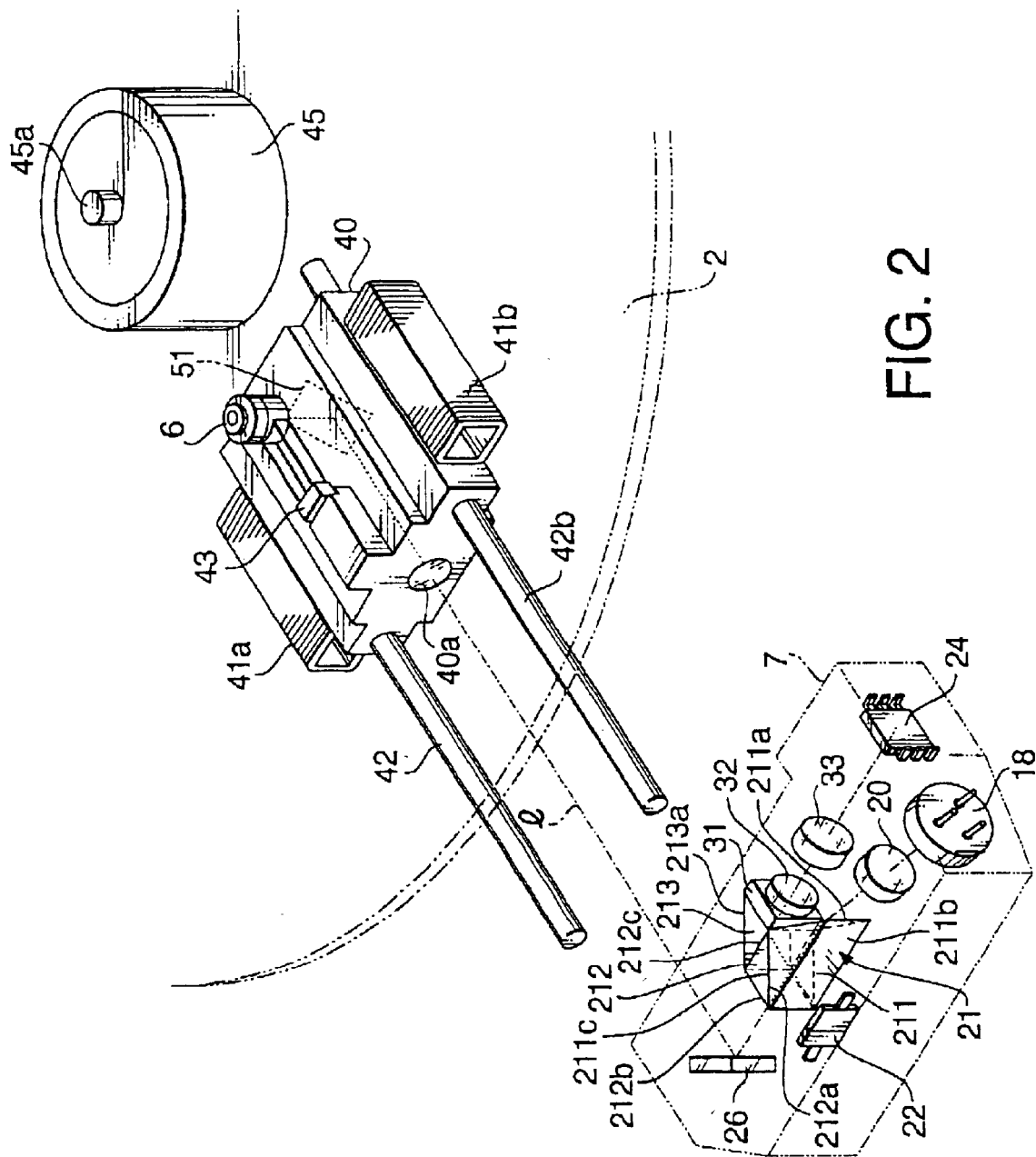
FIG. 2 is an enlarged view of a part of the optical disc drive shown in FIG. 1.

As shown in FIG. 1, and FIG. 2 which is a partially enlarged view of FIG. 1, the optical disc drive 100 has a casing 1. An optical disc 2 can be loaded/unloaded with a not-shown loading mechanism. At a central portion of a bottom surface of the casing 1, a spindle motor 45 is provided. The optical disc 2 is caught at a tip of the rotary shaft 45a of the spindle motor 45, thereby the optical disc 2 being rotated by the spindle motor 45. In a direction of a diameter of the optical disc 2, a pair of guide rails 42a and 42b, which are parallel to each other, extend. At an end portion of the guide rails 42a and 42b, opposite to the spindle motor 45, a light source module 7 is provided. The light source module 7 emits a laser beam L, which is used for recording/reproducing the data. The laser beam L emitted by the light source module 7 travels between the guide rails 42a and 42b.

The guide rails 42a and 42b slidably mount a carriage 40, which mounts an optical system for directing the beam from the light source module 7 toward a desired track of the optical disc 2. The carriage 40 has a pair of coils 41a and 41b, which functions in association with permanent magnet provided on the casing 1 as a pair of linear motors. When the linear motors are actuated (i.e., when the coils 41a and 41b are energized), the carriage 40 moves, as guided by the rails 42a and 42b, in a radial direction (i.e., a tracking direction) of the optical disc 2.

The carriage 40 has an opening 40a on the light source module side. The opening 40a extends in a direction parallel with the guide rails 42a and 42b. The laser beam L emitted by the light source module 7 enters the opening 40a, regardless of the position of the carriage 40 along the pair of guide rails 42a and 42b. An end of the opening 40a is located at a position close to the spindle motor side end of the carriage 40, and at the end portion (i.e., a spindle motor side end) of the opening 40a, a raising mirror 51 is arranged. On a top surface of the carriage 40, immediately above the raising mirror 51, an opening is formed such that the laser beam L incident on the mirror 51 is reflected toward the data recording surface of the optical disc 2 through the opening on the top surface of the carriage 40.

To the opening of the top surface of the carriage 40, an objective lens 6 is provided. Specifically, the objective lens 6 is a single-element lens, having aspherical surfaces as refraction surfaces. The objective lens 6 is supported by a fine actuator 5 so as to be located at the opening on the top surface of the carriage 40. It should be noted that the optical axis of the objective lens 6 and the central axis of the laser beam L are coincident with each other.

Figure 3:
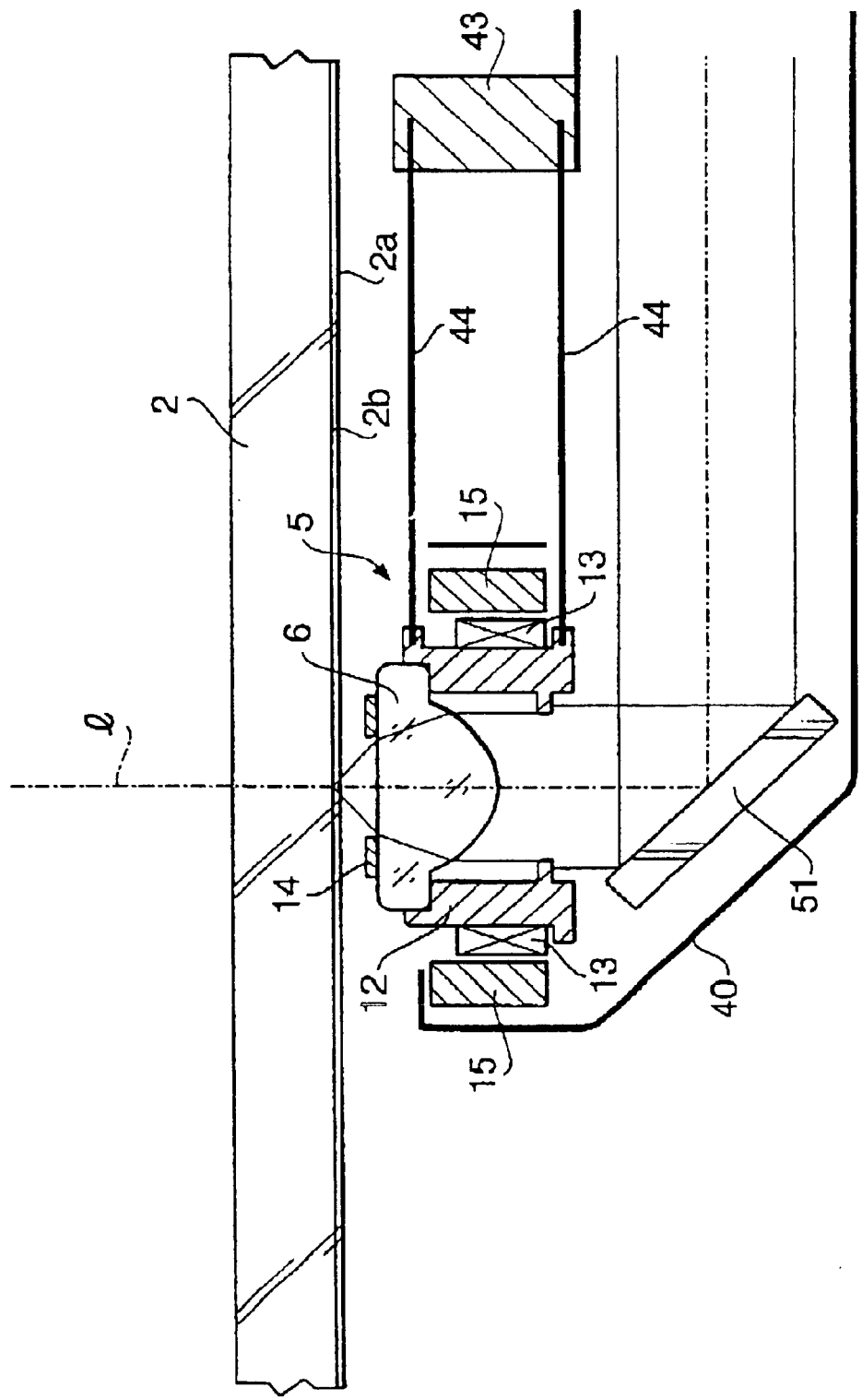
FIG. 3 is a cross sectional view showing a fine actuator and the objective optical system.

The fine actuator 5 has, as shown in FIG. 3, a lens frame 12 for holding the objective lens 6, a supporting unit 43 secured on a top surface of the carriage 40. The fine actuator 5 further includes a set of supporting wires 44. The set of supporting wires 44 consists of four wires 44. Proximal ends of the four wires 44 are fixed onto the supporting unit 43, and the distal ends of the wires 44 hold the lens frame 12 so as to move in a direction of the optical axis of the objective lens 6. The fine actuator 5 further includes an arc-shaped permanent magnet 15 fixed at the opening formed on the top surface of the carriage 40, and a coil 14 on a disc side of the objective lens 6. The coil 14 is coaxial with the optical axis of the objective lens 6.

When an electrical current flows through the focusing coil 13, it is attracted/repelled with respect to the permanent magnet 15, thereby the objective lens 6 held by the lens frame 12 moves in the direction of its optical axis. Accordingly, by adjusting the quantity of the electrical current flowing across the focusing coil 13, the position of the objective lens 6 in its optical axis direction can be adjusted.

The laser beam L reflected by the raising mirror 51 is incident on the objective lens 6, the central axis of the laser beam being coincident with the optical axis of the objective lens 6. The objective lens 6 converges the incident laser beam L on the data recording surface of the optical (magneto-optical) disc 2. It should be noted that the coil 14 is used when data is recording on the optical disc 2 by applying a magnetic field to a portion where a laser bean L is converged.

The light source module 7 accommodates a laser diode 18 emitting a diverging laser beam L, a collimating lens 20 for collimating the laser beam L emitted by the laser diode 18, a complex prism assembly 21 that allows the laser beam L to pass through, and a deflection mirror 26 which reflects the laser beam L passed through the complex prism assembly 21 toward the opening 40a of the carriage 40. The light source module 7 further includes a laser power sensor 22, Wollaston prism 31, a hologram plate 32, a condenser lens 33, and a servo/data sensor 24.

The complex prism assembly 21 has, as a whole, a top surface and bottom surface, which are parallel with each other. As shown in FIG. 2, the complex prism assembly 21 consists of three components: a first prism 211; a second prism 212; and a third prism 213.

The first prism 211 has a light receiving surface 211a, a side surface 211b and a half mirror surface 211c. The light receiving surface 211a and the side surface 211b form an acute angle. The half mirror surface 211c forms an angle of 45 degrees with the side surface 211b.

The second prism 212 has a half mirror surface 212a, which is cemented onto the half mirror surface 211c of the first prism 211, and a light emitting surface 212b and a side surface 212c, each of which forms an angle of 45 degrees with respect to the half mirror surface 212a.

The third prism 213 is a right angle prism which is cemented to the side surface 212c of the second prism 212 such that an oblique surface 213a is parallel with the half mirror surface 212a of the second prism 212.

The complex prism assembly 21 is arranged such that the side surface 211b is perpendicular to the extending direction of the guide rails 42a and 42b (i.e., the moving direction of the carriage 40).

The deflection mirror 26 is secured to a galvano motor (not shown),which is rotatable about an axis parallel to the data recording surface of the optical disc 2, so that the deflection mirror 26 is rotatable within a minute angular range.

The operation of the above-described optical disc drive 1 will be explained.

When data is recorded, the laser diode 18 is driven by an ON/OFF modulated driving current, thereby emitting ON/OFF modulated laser beam L.

The collimating lens 20 is arranged such that the optical axis thereof is inclined with respect to the side surface 211b so that the laser beam L is refracted by the light receiving surface 211a and proceeds in parallel with the side surface 211b. Thus, the laser beam L collimated by the collimating lens 20 is incident on the light receiving surface 211a of the complex prism assembly 21. Due to inclination of the light receiving surface 211a with respect to the optical axis of the collimating lens 20, the laser beam L having an oval cross section is converted to the beam L having a substantially circular cross section. The laser beam L then proceeds in a direction parallel to the side surface 211b inside the first prism 211, and is incident on the half mirror surface 211c.

A part of the laser beam L is reflected by the half mirror surface 211c and is directed to the laser power sensor 22. The laser power sensor 22 outputs a signal indicative of the received light amount. The output signal is fed back to a not shown laser power control circuit, which controls the laser diode 18 to emit the laser beam L having the predetermined intensity.

The remaining part of the laser beam L incident on the half mirror surface 211c passes through the half mirror surface 211c, and emerges from the light emitting surface 212b. The laser beam L is then reflected by the deflection mirror 26 toward the opening 40a of the carriage 40. The reflecting direction of the deflection mirror 26 is precisely controlled using output signals of the servo/data sensor 24. Therefore, at whatever position, along the guide rails 42a and 42b, the carriage 40 is located, the laser beam L enters the opening 40a and is reflected by the raising mirror 51 toward the objective lens 6.

A part of the laser beam L incident on the data recording surface 2b of the optical disc 2 is reflected thereat and proceeds back to the light source unit 7 along the same optical path. The reflected beam returned to the light source unit 7 is reflected by the deflection mirror 26, and is incident on the light emitting surface 212b. The reflected beam entered the complex prism assembly 21 is reflected by the half mirror surface 211c, and incident on the Wollaston prism 31 via the oblique surface 213a of the third prism 213. The Wollaston prism 31 allows only a linearly polarized component having a predetermined polarized direction to pass through. The reflected beam component passed through the Wollaston prism 31 is incident on the servo/data sensor 24 via the hologram plate 32 and the condenser lens 33. The servo/data sensor 24 outputs signals indicative of focusing condition and tracking condition. The output signals are converted into drive signals for the galvano motor and focus coil 13 by a not shown control circuit so that a servo circuit is formed.

When the data is recorded on the optical disc, the spindle motor 45 rotates the optical disc 2, and the linear motor moves the carriage 40 to perform tracking operation, thereby the data recording-operation is continuously performed.

When data recorded on the optical disc 2 is read out, the laser diode 18 is driven to continuously emit a laser beam L having a lower intensity. When the readout operation is performed, the coil 14 is not actuated. The spindle motor 45 rotates the optical disc 2, and the carriage 40 is moved by the linear motor for tracking. The data recording surface is scanned by the laser spot which is converged by the objective lens 6, and the reflected beam is received by the servo/data sensor 24. In this case, the polarization direction of the reflected laser beam L is rotated in accordance with the magnetized direction at a position where the beam spot is incident on the data recording surface of the optical disc 2. Therefore, since the reflected beam passes through the Wollaston prism 31, the intensity of the beam incident on the servo/data sensor 24 corresponds to the polarized direction of the reflected beam, which corresponds to the magnetized direction of the position at which the laser beam is reflected. Therefore, based on the output of the servo/data sensor 24, the data recorded on the data recording surface of the optical disc can be reproduced.

The objective lens 6 is a single-element lens. The light source module side surface is an aspherical surface having a positive power, and the optical disc side surface is an aspherical surface having a positive or negative power. The objective lens 6 is a high-performance lens having an NA of 0.8 or more. It should be noted that the objective lens 6 is designed so that, even if the decentering between the two surfaces is 2 μm, paraxial wavefront aberration is 0.07λ rms or less and is capable of maintaining the performance of the lens for converging the laser beam substantially to a diffraction limit.

By employing the aspherical surface, the coma can be well compensated in comparison with the plano-convex lens. Therefore, even if the NA of the objective lens is significantly high, excellent characteristics of the wavefront aberration and practically sufficient decentering allowance can be obtained.

Since the disc side surface is an aspherical surface, within a practical decentering allowance (±2 μm), a greater radius of the image circle is achieved. Therefore, decentering coma (coma generated due to the decentering of the surfaces of the objective lens 6) is suppressed. Thus, the decentering which may occur when the lens is formed using the mold falls within an allowable range, and the manufacturing cost can be suppressed.

The objective lens 6 should be formed with a flange portion which is used for securing the objective lens 6 to the fine actuator. In order to form such a flange, it is preferable to use material whose refractive index is 1.6 or more. Conventional lenses are typically formed of plastic material. However, in view of the index as well as various factors, it is preferable to use glass material. It should be noted that a thermal expansion factor of the glass material is smaller than that of plastic material by one digit or more. Therefore, the glass material is relatively stable in its shape in terms of the change of the environment, and is reliable.

In particular, in the case of the objective lens 6 according to the invention, the light source side surface, on which the parallel light is incident, is designed to provide the most of the positive power for converging the beam. Therefore, it is very important that the surface shape is stably maintained. Further, if the material having the higher refractive index is used, the curvature of the lens surface can be made relatively small. Therefore, even the marginal rays are incident on the lens at relatively small angles. Such a lens is advantageous in designing and applying a reflection prevention coating. Furthermore, the glass material is advantageous in handling of the lenses after coated and the stability of the coating in comparison to the plastic lens. On the contrary, if the lens is formed of material having relatively low refractive index, the curvature of the lens surfaces should be increased in order to provide a necessary power. Therefore, marginal rays are incident on the lens surface at relatively large angles. This characteristic results in, in association with the fact that the lens surface of the plastic lens is easy to deform due to the temperature change, the wavefront aberration is easily deteriorated.

Specifically, the objective lens 6 is designed such that, when each aspherical surface is expressed by equation (1), conditions (2)–(5) are satisfied.

$$Fi(h) = \frac{h^2}{1 + \sqrt{1 - (1+\kappa)h^2/r^2}} + A_4 h^4 + A_6 h^6 + A_8 h^8 + A_{10} h^{10} + A_{12} h^{12} \quad (1)$$

where, h represents a height of a point on the aspherical surface with respect to the optical axis, Fi(h) represents a SAG amount which is defined as a distance from a point on the aspherical surface to a plane tangential to the aspherical surface at the optical axis, i represents a surface number (i.e., F1(h) represents the shape of the light source module side, and F2(h) represents the shape of the optical disc side), r is a radius of curvature on the optical axis, κ represents a conical coefficient, A4, A6, A8, A10 and A12 are aspherical coefficients for fourth, sixth, eighth, tenth and twelfth order terms.

$$-2 \leq dF1(h)/dh \leq +2 \quad (2)$$

$$-0.1 \leq dF2(h)/dh \leq +0.1 \quad (3)$$

$$+0.5 \leq d^2F1(h)/dh^2 \leq +3.5 \quad (4)$$

$$-0.2 \leq d^2F2(h)/dh^2 \leq +0.2 \quad (5)$$

The objective lens 6 is made of glass material having a refractive index of 1.6 or more, and is formed by compression molding.

Hereinafter, two numerical embodiments and a comparative example are described.

First Embodiment

According to the first embodiment, the cover layer of the optical disc is 0.1 mm thick, the wavelength of the laser beam L is 405 nm, and the NA is 0.85.

Figure 4:
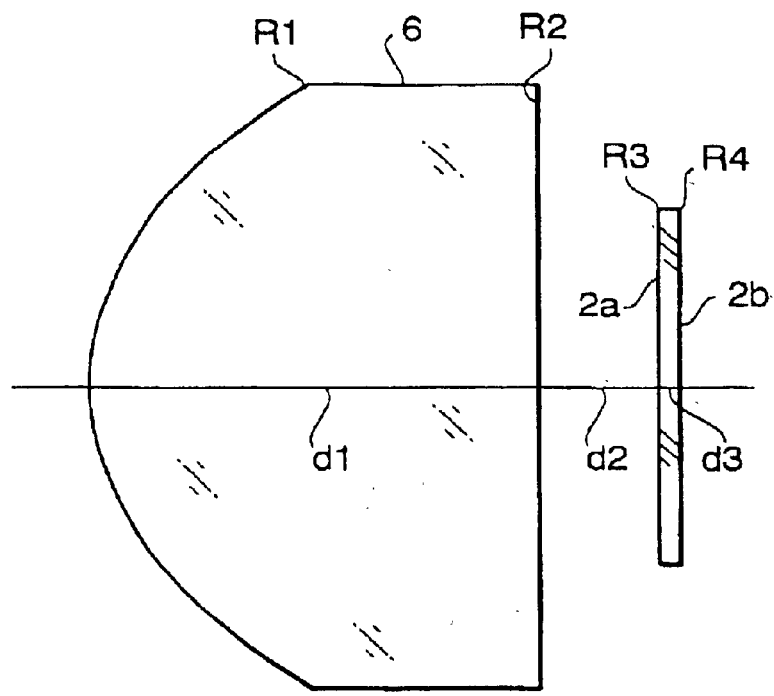
FIG. 4 shows the objective lens.

FIG. 4 shows the objective lens 6 according to the first embodiment, a surface 2a of the cover layer and the data recording surface 2b of the optical disc 2. TABLE 1 indicates numerical structure of the Objective lens 6. It should be noted that, in TABLE 1, the numbers are normalized so that the focal length of the objective lens 6 is represented by one (1).

In TABLE 1, R1 represents the light source side surface, R2 represents the optical disc side surface, R3 represents the surface 2a of the cover layer, and R4 represents the data recording surface 2b of the optical disc 2. FNO denotes the F-number of the objective lens 6, f represents a focal length of the objective lens 6, ω represents half a field angle (unit: degree). Further, r represents a paraxial radius of curvature, d represents a distance between adjoining surfaces along the optical axis, n represents a refractive index at a wavelength of 405 nm, vd represent the Abbe's number, nd represents the refractive index for the d line.

It should be noted that the surfaces R1 and R2 are aspherical surfaces, whose shapes are expressed by equation (1) above. TABLEs 2 and 3 respectively indicate the values of the coefficients of the equation (1) for the lens surfaces R1 and R2.

TABLE 1

FNO = 1:0.588 surface    f = 1.00    ω = 0.5

| number | r | d | n | νd | nd |
|---|---|---|---|---|---|
| R1 | 0.762 | 1.149 | 1.76250 | 40.5 | 1.73077 |
| R2 | 515.151 | 0.316 | — | — | — |
| R3 | inf. | 0.052 | 1.62231 | 29.9 | 1.58547 |
| R4 | inf. | — | — | — | — |

TABLE 2

| | |
|---|---|
| κ | −0.50308 |
| A4 | 0.21381 × 10⁻¹ |
| A6 | 0.16273 × 10⁻¹ |
| A8 | −0.81118 × 10⁻¹ |
| A10 | 0.17431 |
| A12 | −0.27567 |

TABLE 3

| | |
|---|---|
| κ | 0 |
| A4 | 0.42512 |
| A6 | −0.32856 × 10⁺¹ |
| A8 | 0.11792 × 10⁺² |
| A10 | −0.22353 × 10⁺² |
| A12 | 0.17533 × 10⁺² |

TABLE 4 and TABLE 5 shows calculation results with respect to light source side lens surface and the disc side lens surface, respectively. In the TABLE 4, "relative h" represents a normalized value of h with respect to the effective radius (0.85 mm) at the NA of 0.85. In TABLE 5, values of h are calculated such that the effective radius (0.54 mm) of the disc side surface is represented so that the "relative h"=1, and each value is calculated for each relative h.

TABLE 4

| relative h | h (mm) | F1 (h) | dF1 (h)/dh | d²F1 (h)/dh² |
|---|---|---|---|---|
| 1 | 0.850 | 5.895 × 10⁻¹ | 1.54313 | 1.40102 |
| 0.9 | 0.765 | 4.495 × 10⁻¹ | 1.36776 | 2.46921 |
| 0.8 | 0.680 | 3.407 × 10⁻¹ | 1.15188 | 2.51497 |
| 0.7 | 0.595 | 2.528 × 10⁻¹ | 0.94863 | 2.24920 |
| 0.6 | 0.510 | 1.812 × 10⁻¹ | 0.76992 | 1.96254 |
| 0.5 | 0.425 | 1.234 × 10⁻¹ | 0.61332 | 1.73317 |
| 0.4 | 0.340 | 7.781 × 10⁻² | 0.47353 | 1.56527 |
| 0.3 | 0.255 | 4.327 × 10⁻² | 0.34580 | 1.44755 |
| 0.2 | 0.170 | 1.908 × 10⁻² | 0.22631 | 1.37010 |
| 0.1 | 0.085 | 4.748 × 10⁻³ | 0.11193 | 1.32630 |
| 0 | 0 | 0 | 0 | 1.31216 |
| −0.1 | −0.085 | 4.748 × 10⁻³ | −0.11193 | 1.32630 |
| −0.2 | −0.170 | 1.908 × 10⁻² | −0.22631 | 1.37010 |
| −0.3 | −0.255 | 4.327 × 10⁻² | −0.34580 | 1.44755 |
| −0.4 | −0.340 | 7.781 × 10⁻² | −0.47353 | 1.56527 |
| −0.5 | −0.425 | 1.234 × 10⁻¹ | −0.61332 | 1.73317 |
| −0.6 | −0.510 | 1.812 × 10⁻¹ | −0.76992 | 1.96254 |
| −0.7 | −0.595 | 2.528 × 10⁻¹ | −0.94863 | 2.24920 |
| −0.8 | −0.680 | 3.407 × 10⁻¹ | −1.15188 | 2.51497 |
| −0.9 | −0.765 | 4.495 × 10⁻¹ | −1.36776 | 2.46921 |
| −1 | −0.850 | 5.895 × 10⁻¹ | −1.54313 | 1.40102 |

TABLE 5

| relative h | h (mm) | F2 (h) | dF2 (h)/dh | d²F2 (h)/dh² |
|---|---|---|---|---|
| 1 | 0.540 | 2.825 × 10⁻⁴ | −0.00651 | −0.18506 |
| 0.9 | 0.486 | 2.288 × 10⁻⁴ | 0.00281 | −0.15089 |
| 0.8 | 0.432 | 1.808 × 10⁻⁴ | 0.00965 | −0.10333 |
| 0.7 | 0.378 | 1.385 × 10⁻⁴ | 0.01398 | −0.05592 |
| 0.6 | 0.324 | 1.018 × 10⁻⁴ | 0.01551 | 0.00035 |
| 0.5 | 0.270 | 7.071 × 10⁻⁵ | 0.01399 | 0.05378 |
| 0.4 | 0.216 | 4.527 × 10⁻⁵ | 0.01014 | 0.08344 |
| 0.3 | 0.162 | 2.547 × 10⁻⁵ | 0.00560 | 0.07895 |
| 0.2 | 0.108 | 1.132 × 10⁻⁵ | 0.00208 | 0.04905 |
| 0.1 | 0.054 | 2.830 × 10⁻⁶ | 0.00036 | 0.01600 |
| 0 | 0 | 0 | 0 | 0.00194 |
| −0.1 | −0.054 | 2.830 × 10⁻⁶ | −0.00036 | 0.01600 |
| −0.2 | −0.108 | 1.132 × 10⁻⁵ | −0.00208 | 0.04905 |
| −0.3 | −0.162 | 2.547 × 10⁻⁵ | −0.00560 | 0.07895 |
| −0.4 | −0.216 | 4.527 × 10⁻⁵ | −0.01014 | 0.08344 |
| −0.5 | −0.270 | 7.071 × 10⁻⁵ | −0.01399 | 0.05378 |
| −0.6 | −0.324 | 1.018 × 10⁻⁴ | −0.01551 | 0.00035 |
| −0.7 | −0.378 | 1.385 × 10⁻⁴ | −0.01398 | −0.05592 |
| −0.8 | −0.432 | 1.808 × 10⁻⁴ | −0.00965 | −0.10333 |
| −0.9 | −0.486 | 2.288 × 10⁻⁴ | −0.00281 | −0.15089 |
| −1 | −0.540 | 2.825 × 10⁻⁴ | 0.00651 | −0.18506 |

In TABLE 4, values of dF1(h)/dh are distributed in a range between −1.54313 and 1.54313. Accordingly, condition (2) is satisfied. Values of d²F1(h)/dh² are distributed in a range between 1.31216 and 2.51497. Accordingly, condition (4) is satisfied.

In TABLE 5, values of dF2(h)/dh are distributed in a range between −0.01551 and 0.01551. Accordingly, condition (3) is satisfied. Values of d²F2(h)/dh² are distributed in a range between −0.18506 and 0.08344. Accordingly, condition (5) is satisfied.

Figure 5:
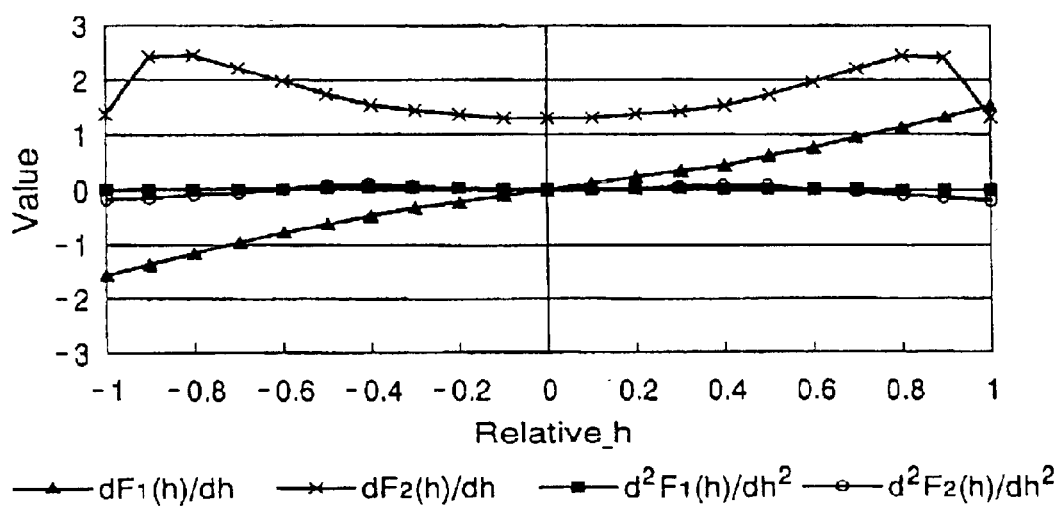
FIG. 5 is a graph showing functions (2)–(5)

FIG. 5 is a graphical representation of values in TABLEs 4 and 5.

Figure 6:
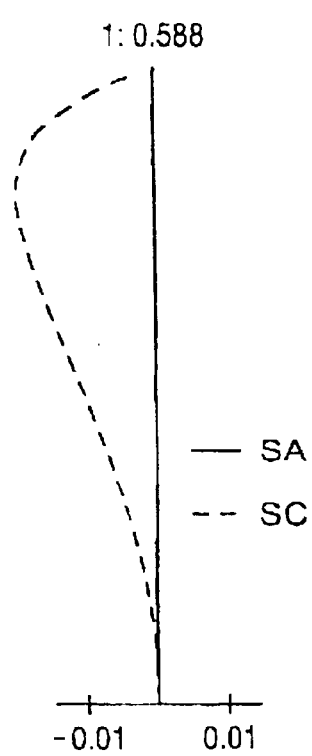
FIG. 6 is a graph showing spherical aberration and sine condition.
Figure 7A:
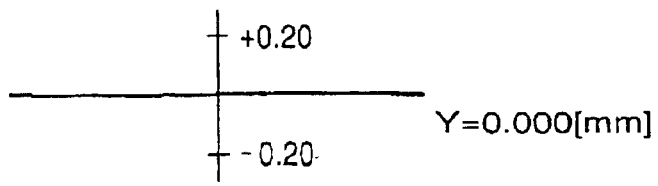
FIGS. 7A–7D are graphs showing wavefront aberrations on meridional planes.
Figure 7B:
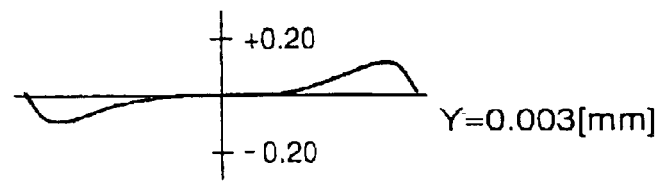
Figure 7C:
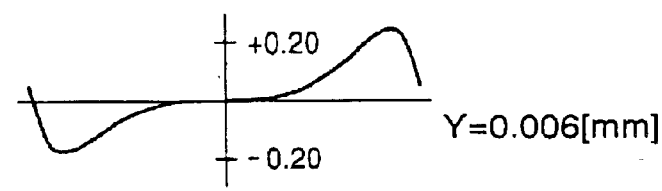
Figure 7D:
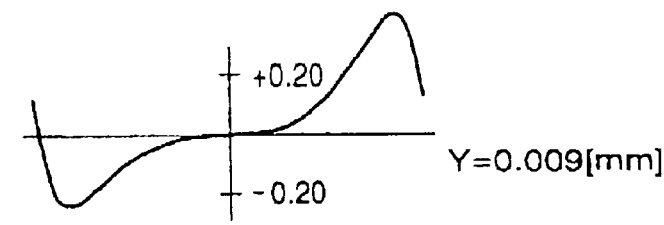

FIG. 6 is a graph showing spherical aberration SA and sine condition SC of the objective lens 6 at a wavelength of 405 nm. As shown in FIG. 6, for the wavelength of 405 nm, the spherical aberration and coma are well compensated for.

FIGS. 7A through 7D are graphs showing wavefront aberration. In the graphs, the horizontal axis represents a pupil coordinate, the vertical axis represents wavefront aberration (unit: λ PV). and Y represents an image height (unit: mm).

As known from FIGS. 7A–7D, the wavefront aberration is well compensated for at the wavelength of 405 nm, and a radius of an image circle is sufficiently large. That is, the values fall within a range of ±0.2λ PV which corresponds to the Marechal criterion of 0.07λ rms for the image height Y equal to or less than 0.006).

Figure 8:
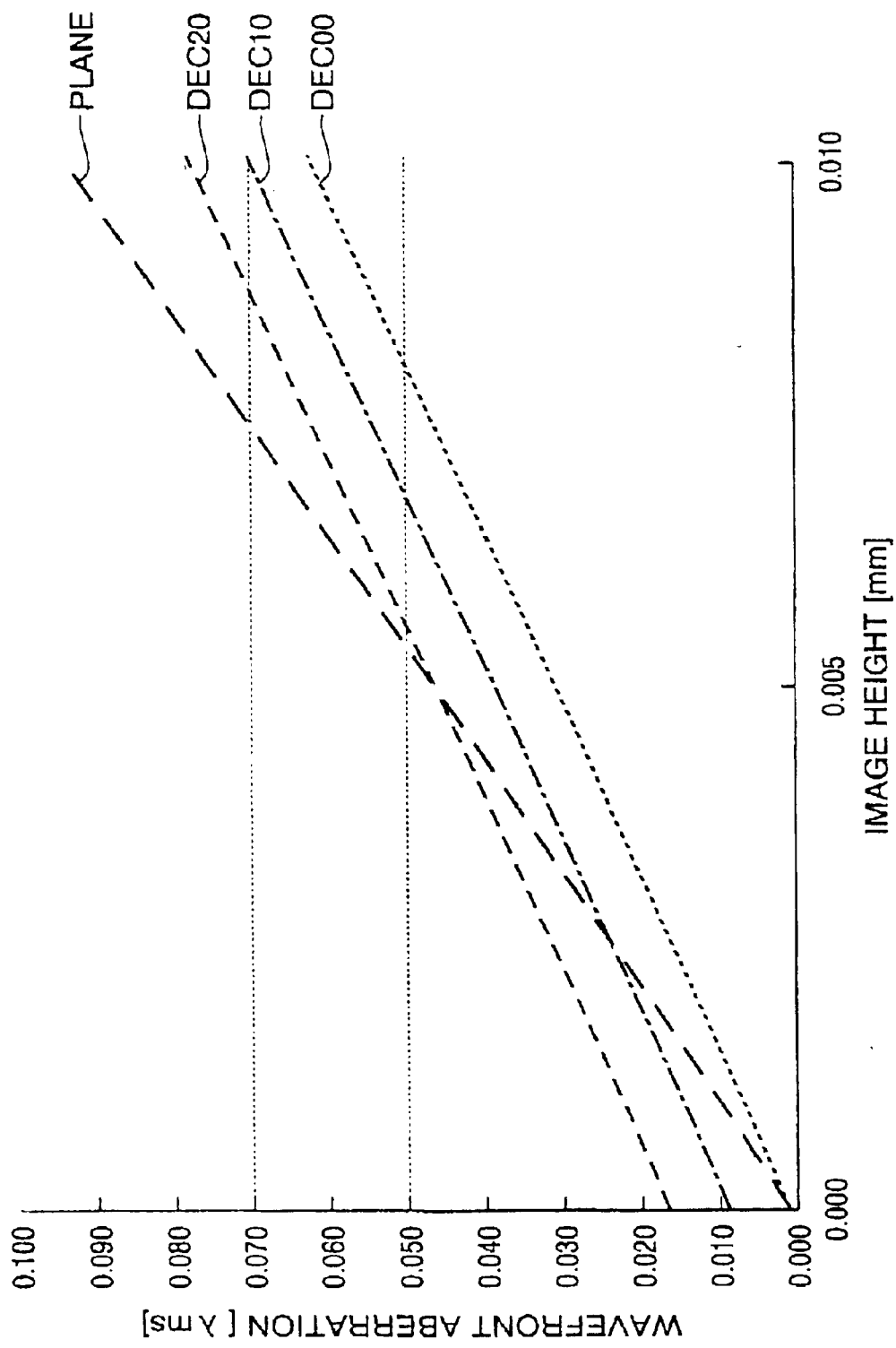
FIG. 8 is a graph showing a relationship between an image height and wavefront aberration.

FIG. 8 shows a relationship between an image height (horizontal axis: mm) and wavefront aberration (vertical axis: λ rms) with a decentering amount between the light, source side surface and the optical disc side surface as a parameter. A curve DEC00 represents the relationship with no decentering amount; a curve DEC10 represents the relationship with the decentering amount of 1.0 μm; a curve DEC20 represents the relationship with the decentering amount of 2.0 μm. A curve PLANE is indicated for comparison and represents the relationship of a plano-convex lens.

As known from FIG. 8, according to the first embodiment, even if the decentering amount is 2 μm, the axial wavefront aberration does not exceed the Marechal evaluation reference value (0.07 λ rms), and further it does not exceeds the practical limitation value of 0.05 λ rms.

As described above, the objective lens 6 according to the first embodiment has a sufficiently high performance for the use of recording/reproducing data with respect to the optical disc.

Second Embodiment

According to the second embodiment, the cover layer of the optical disc is 0.01 mm thick, the wavelength of the laser beam L is 655 nm, and the NA is 0.80.

Figure 9:
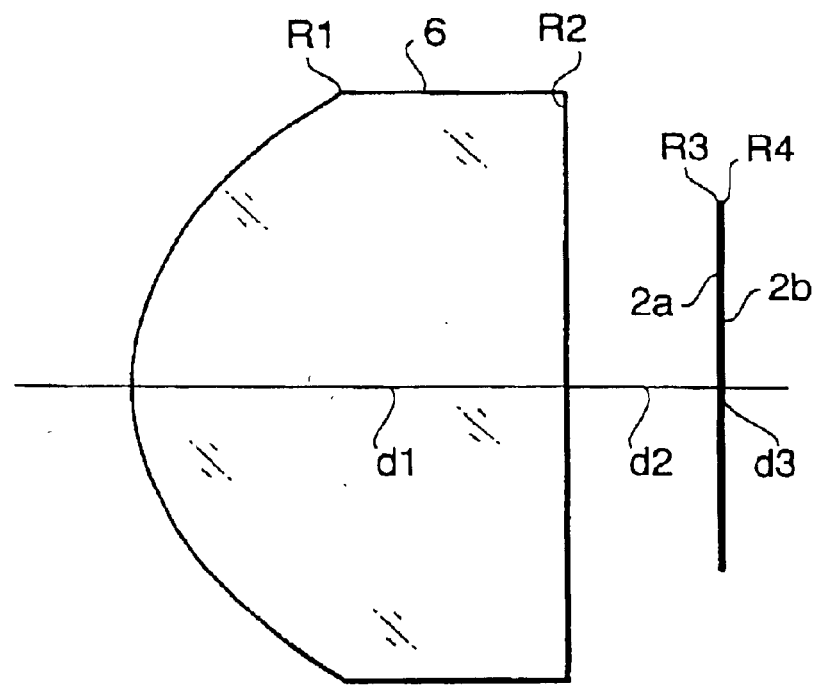
FIG. 9 is a lens chart showing an objective lens according to a second embodiment.

FIG. 9 shows the objective lens 6 according to the second embodiment, a surface 2a of the cover layer and the data recording surface 2b of the optical disc 2. TABLE 6 indicates numerical structure of the Objective lens 6. It should be noted that, in TABLE 6, the numbers are normalized so that the focal length of the objective lens 6 is represented by one (i.e., f=1).

In TABLE 6, the symbols indicated therein have the same meaning as in the first embodiment. In the second embodiment, n represents a refractive index at a wavelength of 655 nm, vd represent the Abbe's number, nd represents the refractive index for the d line.

It should be noted that the surfaces R1 and R2 are aspherical surfaces, whose shapes are expressed by equation (1) above. TABLEs 7 and 8 respectively indicate the values of the coefficients of the equation (1) for the lens surfaces R1 and R2.

TABLE 6

| surface number | r | d | n | vd | nd |
|---|---|---|---|---|---|
| FNO = 1:0.625 | | f = 1.00 | | ω = 0.5 | |
| R1 | 0.735 | 1.059 | 1.72549 | 40.5 | 1.73077 |
| R2 | −21.587 | 0.391 | — | — | — |
| R3 | inf. | 0.005 | 1.48924 | 57.4 | 1.41976 |
| R4 | inf. | — | — | — | — |

TABLE 7

| κ | −0.47005 |
|---|---|
| A4 | $0.10190 \times 10^{-1}$ |
| A6 | $-0.62926 \times 10^{-2}$ |
| A8 | $-0.49576 \times 10^{-1}$ |
| A10 | 0.33730 |
| A12 | −0.28355 |

TABLE 8

| κ | 0 |
|---|---|
| A4 | 0.61166 |
| A6 | $-0.47578 \times 10^{+1}$ |
| A8 | $0.17983 \times 10^{+2}$ |
| A10 | $-0.35919 \times 10^{+2}$ |
| A12 | $0.29822 \times 10^{+2}$ |

TABLE 9 and TABLE 10 shows calculation results with respect to light source side lens surface and the disc side lens surface, respectively. In the TABLE 9, "relative h" represents a normalized value of h with respect to the effective radius (0.80 mm) at the NA of 0.80. In TABLE 10, values of h are calculated such that the effective radius (0.53 mm) of the disc side surface is represented so that the "relative h"=1, and each value is calculated for each relative h.

TABLE 9

| relative h | h (mm) | F1 (h) | dF1 (h)/dh | $d^2$F1 (h)/$dh^2$ |
|---|---|---|---|---|
| 1 | 0.80 | $5.479 \times 10^{-1}$ | 1.46109 | 1.74594 |
| 0.9 | 0.72 | $4.159 \times 10^{-1}$ | 1.29045 | 2.38825 |
| 0.8 | 0.64 | $3.143 \times 10^{-1}$ | 1.09543 | 2.41976 |

TABLE 9-continued

| relative h | h (mm) | F1 (h) | dF1 (h)/dh | $d^2$F1 (h)/$dh^2$ |
|---|---|---|---|---|
| 0.7 | 0.56 | $2.328 \times 10^{-1}$ | 0.90954 | 2.21003 |
| 0.6 | 0.48 | $1.667 \times 10^{-1}$ | 0.74264 | 1.96544 |
| 0.5 | 0.40 | $1.134 \times 10^{-1}$ | 0.59402 | 1.75828 |
| 0.4 | 0.32 | $7.148 \times 10^{-2}$ | 0.45995 | 1.60152 |
| 0.3 | 0.24 | $3.974 \times 10^{-2}$ | 0.33657 | 1.48993 |
| 0.2 | 0.16 | $1.752 \times 10^{-2}$ | 0.22056 | 1.41594 |
| 0.1 | 0.08 | $4.359 \times 10^{-3}$ | 0.10917 | 1.37379 |
| 0 | 0 | 0 | 0 | 1.36011 |
| −0.1 | −0.08 | $4.359 \times 10^{-3}$ | −0.10917 | 1.37379 |
| −0.2 | −0.16 | $1.752 \times 10^{-2}$ | −0.22056 | 1.41594 |
| −0.3 | −0.24 | $3.974 \times 10^{-2}$ | −0.33657 | 1.48993 |
| −0.4 | −0.32 | $7.148 \times 10^{-2}$ | −0.45995 | 1.60152 |
| −0.5 | −0.40 | $1.134 \times 10^{-1}$ | −0.59402 | 1.75828 |
| −0.6 | −0.48 | $1.667 \times 10^{-1}$ | −0.74264 | 1.96544 |
| −0.7 | −0.56 | $2.328 \times 10^{-1}$ | −0.90954 | 2.21003 |
| −0.8 | −0.64 | $3.143 \times 10^{-1}$ | −1.09543 | 2.41976 |
| −0.9 | −0.72 | $4.159 \times 10^{-1}$ | −1.29045 | 2.38825 |
| −1 | −0.80 | $5.479 \times 10^{-1}$ | −1.46109 | 1.74594 |

TABLE 10

| relative h | h (mm) | F2 (h) | dF2 (h)/dh | $d^2$F2 (h)/$dh^2$ |
|---|---|---|---|---|
| 1 | 0.530 | $-6.486 \times 10^{-3}$ | −0.01769 | −0.16890 |
| 0.9 | 0.477 | $-5.255 \times 10^{-3}$ | −0.00829 | −0.16706 |
| 0.8 | 0.424 | $-4.154 \times 10^{-3}$ | −0.00051 | −0.12624 |
| 0.7 | 0.371 | $-3.182 \times 10^{-3}$ | 0.00501 | −0.08001 |
| 0.6 | 0.318 | $-2.339 \times 10^{-3}$ | 0.00768 | −0.01875 |
| 0.5 | 0.265 | $-1.625 \times 10^{-3}$ | 0.00700 | 0.04207 |
| 0.4 | 0.212 | $-1.041 \times 10^{-3}$ | 0.00374 | 0.07419 |
| 0.3 | 0.159 | $-5.855 \times 10^{-4}$ | −0.00009 | 0.06300 |
| 0.2 | 0.106 | $-2.602 \times 10^{-4}$ | −0.00236 | 0.01950 |
| 0.1 | 0.053 | $-6.506 \times 10^{-6}$ | −0.00210 | −0.02681 |
| 0 | 0 | 0 | 0 | −0.04632 |
| −0.1 | −0.053 | $-6.506 \times 10^{-6}$ | 0.00210 | −0.02681 |
| −0.2 | −0.106 | $-2.602 \times 10^{-4}$ | 0.00236 | 0.01950 |
| −0.3 | −0.159 | $-5.855 \times 10^{-4}$ | 0.00009 | 0.06300 |
| −0.4 | −0.212 | $-1.041 \times 10^{-3}$ | −0.00374 | 0.07419 |
| −0.5 | −0.265 | $-1.625 \times 10^{-3}$ | −0.00700 | 0.04207 |
| −0.6 | −0.318 | $-2.339 \times 10^{-3}$ | −0.00768 | −0.01875 |
| −0.7 | −0.371 | $-3.182 \times 10^{-3}$ | −0.00501 | −0.08001 |
| −0.8 | −0.424 | $-4.154 \times 10^{-3}$ | 0.00051 | −0.12624 |
| −0.9 | −0.477 | $-5.255 \times 10^{-3}$ | 0.00829 | −0.16706 |
| −1 | −0.530 | $-6.486 \times 10^{-3}$ | 0.01769 | −0.16890 |

In TABLE 9, values of dF1(h)/dh are distributed in a range between −1.46109 and 1.46109. Accordingly, condition (2) is satisfied. Values of $d^2$F1(h)/$dh^2$ are distributed in a range between 1.36011 and 2.41976. Accordingly, condition (4) is satisfied.

In TABLE 10, values of dF2(h)/dh are distributed in a range between −0.01769 and 0.01769. Accordingly, condition (3) is satisfied. Values of $d^2$F2(h)/$dh^2$ are distributed in a range between −0.16890 and 0.07419. Accordingly, condition (5) is satisfied.

Figure 10:
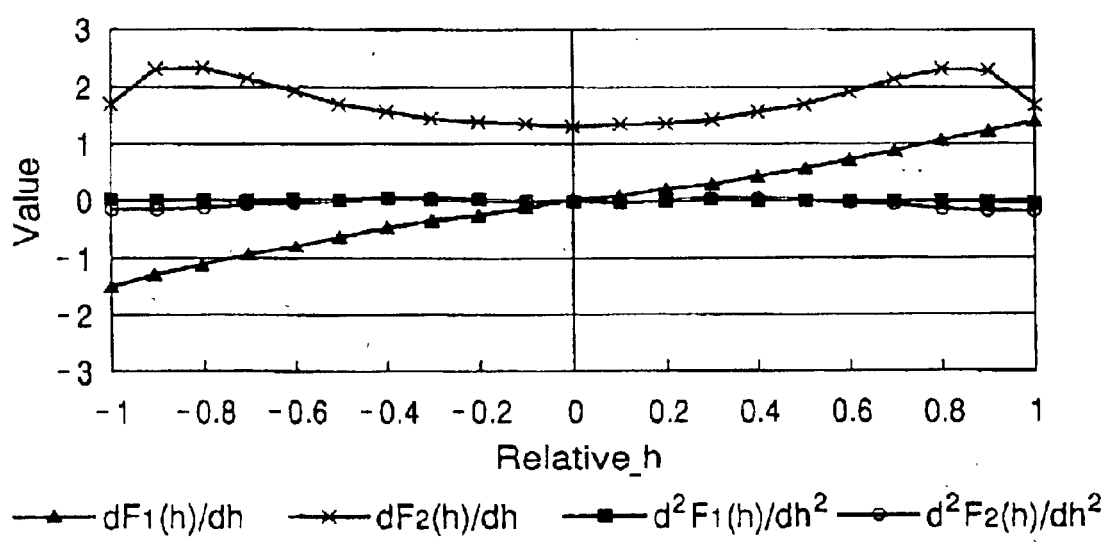
FIG. 10 is a graph showing functions (2)–(5)

FIG. 10 is a graphical representation of values in TABLEs 9 and 10.

Figure 11:
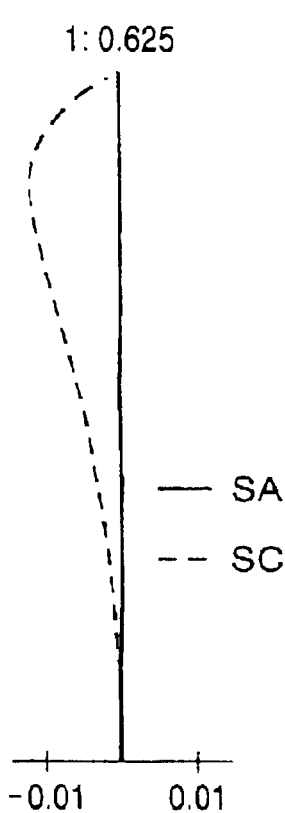
FIG. 11 is a graph showing spherical aberration and sine condition of the objective lens according to the second embodiment.
Figure 12A:
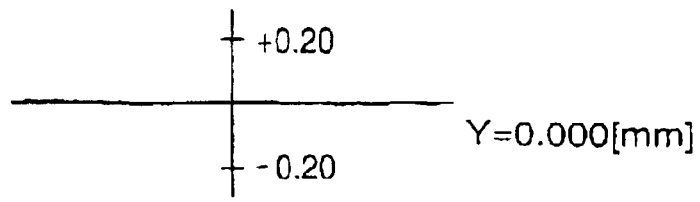
FIGS. 12A–12D are graphs showing wavefront aberration on meridional planes.
Figure 12B:
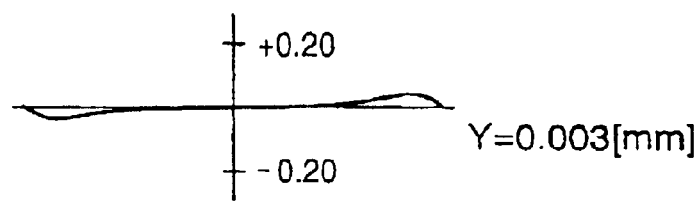
Figure 12C:
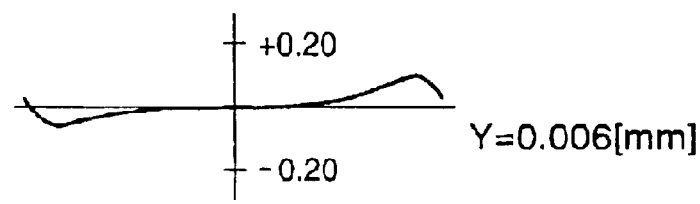
Figure 12D:
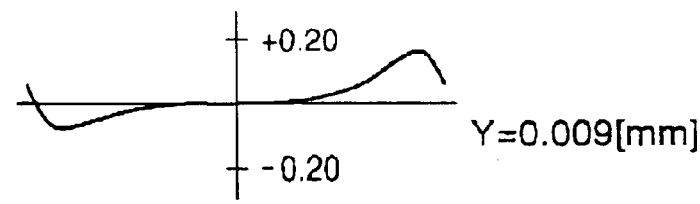

FIG. 11 is a graph showing spherical-aberration SA and sine condition SC of the objective lens 6 at a wavelength of 655 nm. As shown in FIG. 11, for the wavelength of 655 nm, the spherical aberration and coma are well compensated for.

FIGS. 12A through 12D are graphs showing wavefront aberration.

As known from FIGS. 12A–12D, the wavefront aberration is well compensated for at the wavelength of 655 nm, and a radius of an image circle is sufficiently large. That is, the values fall within a range of ±0.2λ PV which corresponds to the Marechal criterion of 0.07λ rms for the image height Y equal to or less than 0.006).

Figure 13:
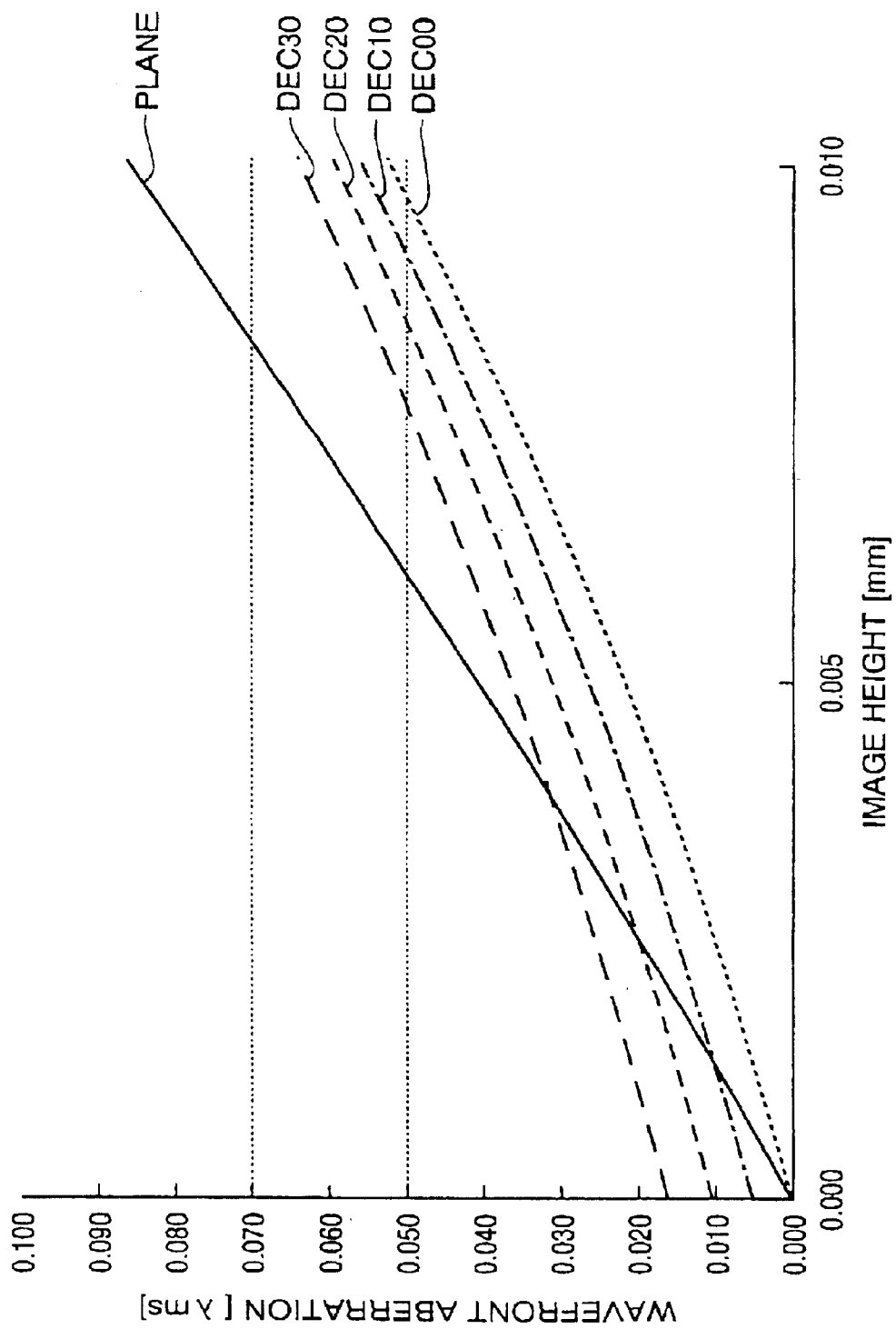
FIG. 13 is a graph showing a relationship between an image height and wavefront aberration according to the second embodiment.

FIG. 13 shows a relationship between an image height (horizontal axis: mm) and wavefront aberration (vertical axis: λ rms,) with a decentering amount between the light source side surface and the optical disc side surface as a parameter. A curve DEC00 represents the relationship with no decentering amount; a curve DEC10 represents the relationship with the decentering amount of 1.0 μm; a curve DEC20 represents the relationship with the decentering amount of 2.0 μm; a curve DEC30 represents the relationship with the decentering amount of 3.0 μm. A curve PLANE is indicated for comparison and represents the relationship of a plano-convex lens.

As known from FIG. 13, according to the first embodiment, even if the decentering amount is 2 μm, the axial wavefront aberration does not exceed the Marechal criterion (0.07λ rms), and further it does not exceeds the practical limitation value of 0.05λ rms.

As described above, the objective lens 6 according to the second embodiment has a sufficiently high performance for the use of recording/reproducing data with respect to the optical disc.

Comparative Example

According to the comparative example, the cover layer of the optical disc is 0.1 mm thick, the wavelength of the laser beam L is 405 nm, and the NA is 0.85.

Figure 14:
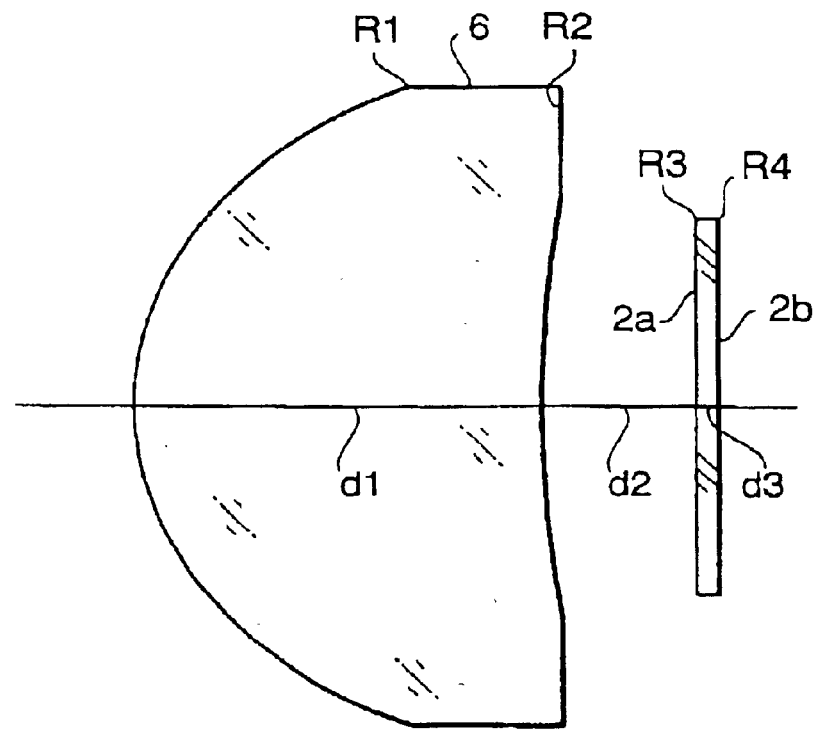
FIG. 14 is a lens chart showing an objective lens according to a comparative example.

FIG. 14 shows an objective lens 6' according to the comparative example, a surface 2a of the cover layer and the data recording surface 2b of the optical disc 2. TABLE 11 indicates numerical structure of the Objective lens 6. It should be noted that, in TABLE 11, the numbers are normalized so that the focal length of the objective lens 6 is represented by one (1)

In TABLE 11, the symbols indicated therein have the same meaning as in the first embodiment.

It should be noted that the surfaces R1 and R2 are aspherical surfaces, whose shapes are expressed by equation (1) above. TABLEs 12 and 13 respectively indicate the values of the coefficients of the equation (1) for the lens surfaces R1 and R2.

TABLE 11

| FNO = 1:0.588 | | | | | |
|---|---|---|---|---|---|
| surface | | f = 1.00 | | ω = 0.5 | |
| number | r | d | n | vd | nd |
| R1 | 0.741 | 1.005 | 1.76250 | 40.5 | 1.73077 |
| R2 | 11.053 | 0.382 | — | — | — |
| R3 | inf. | 0.052 | 1.62231 | 29.9 | 1.58547 |
| R4 | inf. | — | — | — | — |

TABLE 12

| κ | −0.38523 |
|---|---|
| A4 | $0.16890 \times 10^{-2}$ |
| A6 | $0.57349 \times 10^{-2}$ |
| A8 | $-0.35097 \times 10^{-2}$ |
| A10 | $0.23743 \times 10^{-1}$ |
| A12 | $-0.28827 \times 10^{-1}$ |

TABLE 13

| κ | 0 |
|---|---|
| A4 | 0.72252 |
| A6 | $-0.21168 \times 10^{+1}$ |
| A8 | $0.44234 \times 10^{+1}$ |
| A10 | $-0.53047 \times 10^{+1}$ |
| A12 | $0.27766 \times 10^{+1}$ |

TABLE 14 and TABLE 15 show calculation results with respect to light source side lens surface and the disc side lens surface, respectively. In TABLE 14, "relative h" represents a normalized value of h with respect to the effective radius (0.85 mm) at the NA of 0.85. In TABLE 15, values of h are calculated such that the effective radius (0.57 mm) of the disc side surface is represented so that the "relative h"=1, and each value is calculated for each relative h.

TABLE 14

| relative h | h (mm) | F1 (h) | dF1 (h)/dh | $d^2$F1 (h)/dh$^2$ |
|---|---|---|---|---|
| 1 | 0.850 | $6.765 \times 10^{-1}$ | 2.62573 | 15.9253 |
| 0.9 | 0.765 | $4.967 \times 10^{-1}$ | 1.76686 | 6.66767 |
| 0.8 | 0.680 | $3.678 \times 10^{-1}$ | 1.32783 | 4.06574 |
| 0.7 | 0.595 | $2.686 \times 10^{-1}$ | 1.03706 | 2.90623 |
| 0.6 | 0.510 | $1.904 \times 10^{-1}$ | 0.81916 | 2.27801 |
| 0.5 | 0.425 | $1.287 \times 10^{-1}$ | 0.64278 | 1.90210 |
| 0.4 | 0.340 | $8.066 \times 10^{-2}$ | 0.49193 | 1.66495 |
| 0.3 | 0.255 | $4.468 \times 10^{-2}$ | 0.35736 | 1.51273 |
| 0.2 | 0.170 | $1.965 \times 10^{-2}$ | 0.23315 | 1.41779 |
| 0.1 | 0.085 | $4.883 \times 10^{-3}$ | 0.11513 | 1.36558 |
| 0 | 0 | 0 | 0 | 1.34890 |
| −0.1 | −0.085 | $4.883 \times 10^{-3}$ | −0.11513 | 1.36558 |
| −0.2 | −0.170 | $1.965 \times 10^{-2}$ | −0.23315 | 1.41779 |
| −0.3 | −0.255 | $4.468 \times 10^{-2}$ | −0.35736 | 1.51273 |
| −0.4 | −0.340 | $8.066 \times 10^{-2}$ | −0.49193 | 1.66495 |
| −0.5 | −0.425 | $1.287 \times 10^{-1}$ | −0.64278 | 1.90210 |
| −0.6 | −0.510 | $1.904 \times 10^{-1}$ | −0.81916 | 2.27801 |
| −0.7 | −0.595 | $2.686 \times 10^{-1}$ | −1.03706 | 2.90623 |
| −0.8 | −0.680 | $3.678 \times 10^{-1}$ | −1.32783 | 4.06574 |
| −0.9 | −0.765 | $4.967 \times 10^{-1}$ | −1.76686 | 6.66767 |
| −1 | −0.850 | $6.765 \times 10^{-1}$ | −2.62573 | 15.9253 |

TABLE 15

| relative h | h (mm) | F2 (h) | dF2 (h)/dh | $d^2$F2 (h)/dh$^2$ |
|---|---|---|---|---|
| 1 | 0.570 | $1.444 \times 10^{-2}$ | 0.24628 | 0.70689 |
| 0.9 | 0.513 | $1.175 \times 10^{-2}$ | 0.20731 | 0.66187 |
| 0.8 | 0.456 | $9.323 \times 10^{-3}$ | 0.17067 | 0.62482 |
| 0.7 | 0.399 | $7.161 \times 10^{-3}$ | 0.13600 | 0.59175 |
| 0.6 | 0.342 | $5.273 \times 10^{-3}$ | 0.10336 | 0.55098 |
| 0.5 | 0.285 | $3.668 \times 10^{-3}$ | 0.07360 | 0.48910 |
| 0.4 | 0.228 | $2.350 \times 10^{-3}$ | 0.04811 | 0.40109 |
| 0.3 | 0.171 | $1.322 \times 10^{-3}$ | 0.02821 | 0.29559 |
| 0.2 | 0.114 | $5.879 \times 10^{-4}$ | 0.01436 | 0.19297 |
| 0.1 | 0.057 | $1.470 \times 10^{-4}$ | 0.00568 | 0.11798 |
| 0 | 0 | 0 | 0 | 0.09047 |
| −0.1 | 0.057 | $1.470 \times 10^{-4}$ | −0.00568 | 0.11798 |
| −0.2 | 0.114 | $5.879 \times 10^{-4}$ | −0.01436 | 0.19297 |
| −0.3 | 0.171 | $1.322 \times 10^{-3}$ | −0.02821 | 0.29559 |
| −0.4 | 0.228 | $2.350 \times 10^{-3}$ | −0.04811 | 0.40109 |
| −0.5 | 0.285 | $3.668 \times 10^{-3}$ | −0.07360 | 0.48910 |
| −0.6 | 0.342 | $5.273 \times 10^{-3}$ | −0.10336 | 0.55098 |
| −0.7 | 0.399 | $7.161 \times 10^{-3}$ | −0.13600 | 0.59175 |
| −0.8 | 0.456 | $9.323 \times 10^{-3}$ | −0.17067 | 0.62482 |
| −0.9 | 0.513 | $1.175 \times 10^{-2}$ | −0.20731 | 0.66187 |
| −1 | 0.570 | $1.444 \times 10^{-2}$ | −0.24628 | 0.70689 |

In TABLE 14, values of dF1(h)/dh are distributed in a range between −2.62573 and 2.62573. Accordingly, condition (2) is not satisfied. Values of $d^2$F1(h)/dh$^2$ are distributed in a range between 1.34890 and 15.9253. Accordingly, condition (4) is not satisfied.

In TABLE 15, values of dF2(h)/dh are distributed in a range between −0.24628 and 0.24628. Accordingly, condition (3) is not satisfied. Values of $d^2F2(h)/dh^2$ are distributed in a range between −0.09047 and 0.70689. Accordingly, condition (5) is not satisfied.

Figure 15:
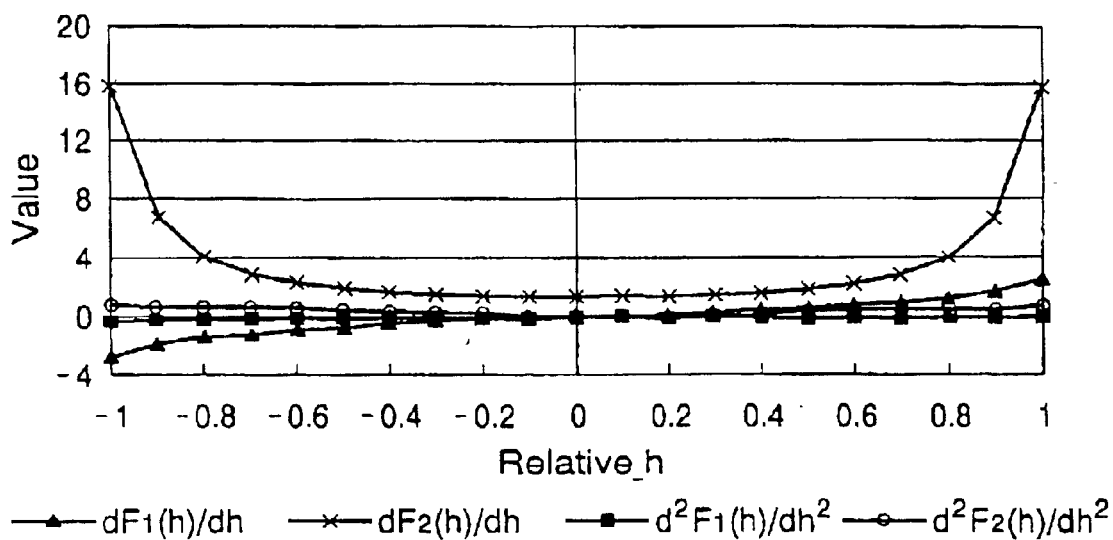
FIG. 15 is a graph showing functions (2)–(5)

FIG. 15 is a graphical representation of values in TABLEs 14 and 15.

Figure 16:
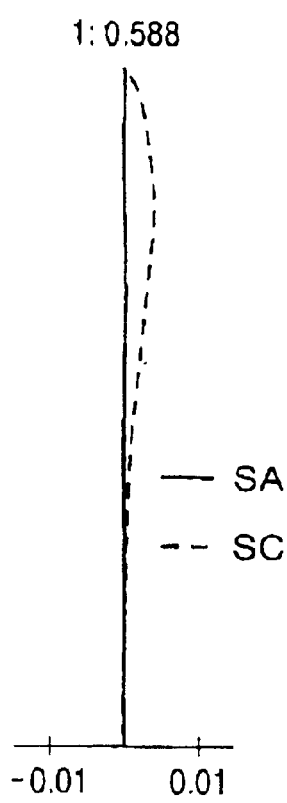
FIG. 16 is a graph showing spherical aberration and sine condition of the objective lens according to the comparative example.
Figure 17A:
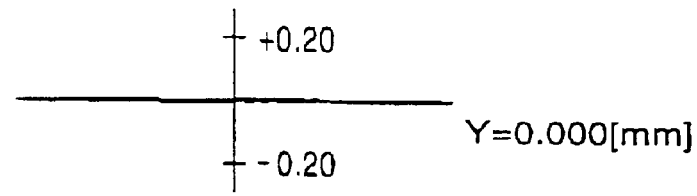
FIGS. 17A–17D are graphs showing wavefront aberration on meridional planes.
Figure 17B:
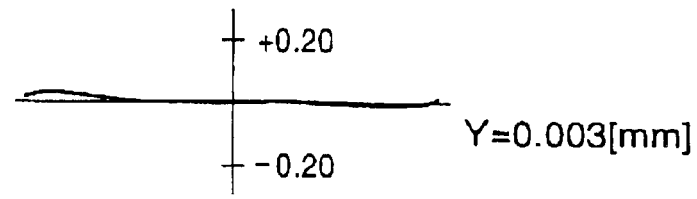
Figure 17C:
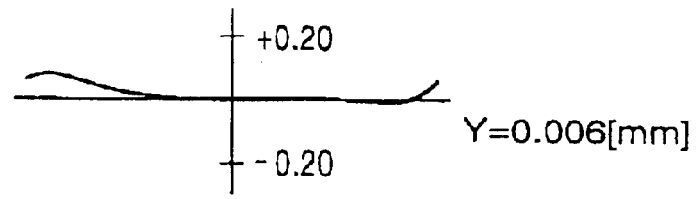
Figure 17D:
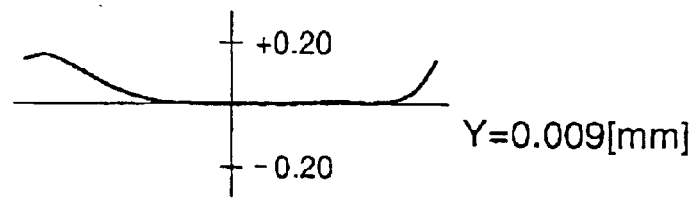

FIG. 16 is a graph showing spherical aberration SA and sine condition SC of the objective lens 6' at a wavelength of 405 nm. As shown in FIG. 16, for the wavelength of 405 nm, the spherical aberration and coma are well compensated for.

FIGS. 17A through 17D are graphs showing wavefront aberration.

As known from FIGS. 17A–17D, the wavefront aberration is well compensated for at the wavelength of 405 nm, and a radius of an image circle is sufficiently large. That is, the values fall within a range of ±0.2λ PV which corresponds to the Marechal criterion of 0.07λ rms for the image height Y equal to or less than 0.006).

Figure 18:
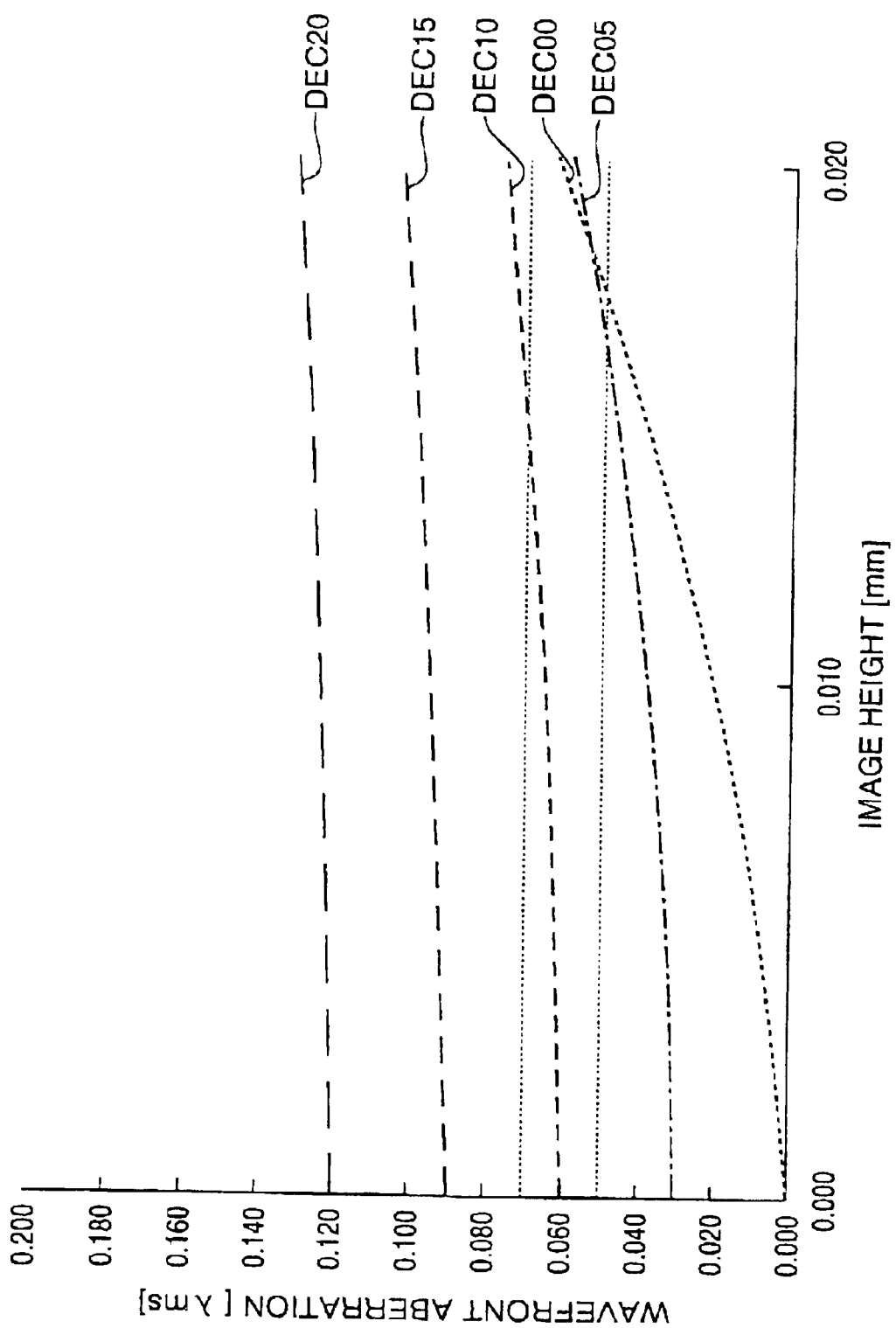
FIG. 18 is a graph showing a relationship between an image height and wavefront aberration according to the comparative example.

FIG. 18 shows a relationship between an image height (horizontal axis: mm) and wavefront aberration (vertical axis: λ rms) with a decentering amount between the light source side surface and the optical disc side surface as a parameter. A curve DEC00 represents the relationship with no decentering amount; a curve DEC05 represents the relationship with the decentering amount of 0.5 μm; a curve DEC10 represents the relationship with the decentering amount of 1.0 μm; a curve DEC15 represents the relationship with the decentering amount of 1.5 μm; and a curve DEC20 represents the relationship with the decentering amount of 2.0 μm.

As known from FIG. 18, according to the comparative example, if the decentering amount is 1.5 μm or more, the axial wavefront aberration exceeds the Marechal criterion (0.07λ rms). Even when the decentering amount is 1.0 μm or more, the axial wavefront aberration exceeds the practical limitation value of 0.05λ rms. Therefore, according to the comparative example, the decentering allowance is substantially 0.5 μm. Therefore, the objective lens 6' according to the comparative example cannot provide high yielding ratio.

The present disclosure relates to the subject matter contained in Japanese Patent Application No. 2001-303336, filed on Sep. 28, 2001, which is expressly incorporated herein by reference in its entirety.

What is claimed is:

1. A single-element objective lens for an optical pick-up, said objective lens converging substantially parallel light incident thereon onto a data recording surface of an optical recording medium, a first surface, which is a light incident side surface, of said objective lens being an aspherical surface having a positive power, a second surface, which is an optical recording medium side surface, of said objective lens being an aspherical surface having one of positive and negative power, paraxial wavefront aberration being 0.07λ rms or less when a decentering amount between said first and second surfaces is 2 μm or less so as to converge the incident light substantially to a diffraction limit, a numerical aperture of said objective lens being 0.8 or more, wherein, when an aspherical surface is expressed by equation:

$$Fi(h) = \frac{h^2}{1 + \sqrt{1-(1+\kappa)h^2/r^2}} + A_4h^4 + A_6h^6 + A_8h^8 + A_{10}h^{10} + A_{12}h^{12}$$

where, h represents a height of a point on the aspherical surface with respect to the optical axis, Fi(h) represents a SAG amount which is defined as a distance from a point on the aspherical surface to a plane tangential to the aspherical surface at the optical axis, i represents a surface number (i.e.. F1(h) represents the shape of the light incident side, and F2(h) represents the shape of the optical recording medium side), r is a radius of curvature on the optical axis, K represents a conical coefficient, $A_4$, $A_6$, $A_8$, $A_{10}$ and $A_{12}$ are aspherical coefficients for fourth, sixth, eighth, tenth and twelfth order terms, then, each of the first and second surfaces are formed to satisfy conditions:

$-2 \leq dF1(h)/dh \leq +2$, $-0.1 \leq dF2(h)/dh \leq +0.1$, $+0.5 \leq d^2F1(h)/dh^2 \leq +3.5$, and $-0.2 \leq d^2F2(h)/dh^2 \leq +0.2$.

2. The single-element objective lens according to claim 1, which is made of glass material having a refractive index of 1.6 or more, said objective lens being formed by molding.

* * * * *